United States Patent
Okazaki et al.

(10) Patent No.: US 12,545,764 B2
(45) Date of Patent: Feb. 10, 2026

(54) LOW-REFRACTIVITY OPTICAL CLEAR RESIN

(71) Applicant: BenQ Materials Corporation, Taoyuan (TW)

(72) Inventors: Tetsuya Okazaki, Taoyuan (TW); Wen-Hsin Yang, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 572 days.

(21) Appl. No.: 18/080,616

(22) Filed: Dec. 13, 2022

(65) Prior Publication Data

US 2024/0199818 A1   Jun. 20, 2024

(30) Foreign Application Priority Data

Dec. 9, 2022   (TW) .................................. 111147472

(51) Int. Cl.

| | |
|---|---|
| *C08G 77/44* | (2006.01) |
| *C08G 77/04* | (2006.01) |
| *C08L 83/04* | (2006.01) |
| *C09D 7/20* | (2018.01) |
| *C09D 183/04* | (2006.01) |

(52) U.S. Cl.
CPC ............... *C08G 77/44* (2013.01); *C09D 7/20* (2018.01); *C09D 183/04* (2013.01); *C08G 77/04* (2013.01); *C08L 83/04* (2013.01)

(58) Field of Classification Search
None
See application file for complete search history.

(56) References Cited

U.S. PATENT DOCUMENTS

2021/0301136 A1 *   9/2021   Paulasaari ............ C08K 5/5419

FOREIGN PATENT DOCUMENTS

TW                 202033622 A        9/2020

* cited by examiner

*Primary Examiner* — Marc S Zimmer
*Assistant Examiner* — Virginia L Stonehocker

(57) ABSTRACT

A low-refractivity optical clear resin is disclosed. The low-refractivity optical clear resin comprises a polysiloxane composition and an organic solvent composition, wherein the polysiloxane composition comprises a polysiloxane and a hydroxyalkylsilane monomer, and the organic solvent composition comprises a high boiling point solvent with a boiling point more than 180° C. and a low boiling point solvent with a boiling point less than 150° C.; wherein the used amount of the organic solvent composition is 50 to 120 parts by weight per 10 parts by weight of the polysiloxane composition. The present low-refractivity optical clear resin can be used on the micro light emitting diode (micro-LED) display devices to enhance the light extracting efficiency thereof, and provide excellent optical properties on an adequate coating thickness.

11 Claims, No Drawings

LOW-REFRACTIVITY OPTICAL CLEAR RESIN

CROSS-REFERENCE TO RELATED APPLICATION

This application claims the priority benefit of Taiwanese Application Serial Number 111147472, filed on Dec. 9, 2022, which is incorporated herein by reference.

TECHNICAL FILED

The present invention relates to a low-refractivity optical clear resin, and more particularly to a low-refractivity optical clear resin for micro-LED display devices.

BACKGROUND OF THE INVENTION

With the self-illuminating electroluminescent display gradually substituting the non-self-illuminating liquid crystal display, the application of the light-emitting diode displays (LED) also from the backlight of the liquid crystal displays get transferred to the self-illuminating display pixels. However, when LEDs are applied to display pixels, in addition to the requirement of the reduced size of a micron-level to form a micro-LED display, the difficulty of the separating setting of micro-lenses that can control the light type and enhance the luminous efficiency, to each light-emitting chips, resulting in the luminous efficiency of the display pixels less than the theoretical value. Furthermore, although the internal quantum efficiency of micro-LED can reach more than 90%, without setting the micro-lenses with a specific curvature to control the light-emitting angle, the large difference of the refractive index between the light-emitting chips made of inorganic materials and the air, resulting in the total reflection, cause a low external quantum efficiency of display pixels (only about 10%).

Therefore, a low-refractive layer formed on the micro-LED display devices with a refractive index less than the refractive index of light-emitting chips has been proposed, to decrease the total reflection between the light-emitting chips and the air, bringing the increase of the luminous efficiency. However, the area of display devices or pixels occupied by the light-emitting chips is small, and the light-emitting chip of each pixels exists gap with the substrate, thus an excellent filling-ability of the low-refractive layer is required, further avoid the large difference of the refractive index between the light-emitting chips and the substrate, resulting in the flickering and poor visibility of the micro-LED displays under ambient light.

In the prior art, various methods of forming a low-refractive layer on a substrate have been proposed. Such as a low-refractive layer prepared by coating a composition comprising hollow inorganic particles and a binder. However, for achieving a desired refractivity of the low-refractivity optical clear layer, a large amount of hollow inorganic particles may need to be used in the coating composition, that may result in the haze increased and the coating cracked during the curing. The low-refractive layer on a substrate can also be made from a coating composition comprising a fluoropolymer, the low surface energy of the coating layer obtained from the composition may cause a poor adhesion between the low-refractive layer and the substrate due to the fluoropolymer, and the hardness or durability thereof is unsatisfied. In addition, in technology field of the optical waveguide, it has proposed a dielectric and low-refractivity nano-porous layer prepared by coating a siloxane composition on a light guide element and curing at more than 150° C. However, when the siloxane composition is applied to the display technology filed as a coating, the porous structure of the coating obtained from the siloxane composition is hard to maintain the low refractivity and desired yellow index with a desired thickness of the coating layer without crack.

Therefore, it demands a low-refractivity optical clear resin which can be applied to micro-LED display devices to enhance the light extracting efficiency thereof, and provide excellent optical properties with an adequate coating thickness.

SUMMARY OF THE INVENTION

One aspect of the preset disclosure is directed to a low-refractivity optical clear resin for micro-LED display devices to enhance the light extracting efficiency thereof. The present optical clear resin, when be used in micro-LED display devices, shows limited yellowing after curing without affecting the hue and chroma of the display and can reach an adequate thickness without crack.

The present low-refractivity optical clear resin comprises a polysiloxane composition and an organic solvent composition, wherein the polysiloxane composition comprises a polysiloxane and a hydroxyalkylsilane monomer, and the organic solvent composition comprises a high boiling point solvent with a boiling point more than 180° C. and a low boiling point solvent with a boiling point less than 150° C.; wherein the used amount of the organic solvent composition is 50 to 120 parts by weight per 10 parts by weight of the polysiloxane composition.

In the present low-refractivity optical clear resin, the organic solvent composition comprises 97 to 80 weight percent of the high boiling point solvent and 3 to 20 weight percent of the low boiling point solvent, and preferably comprises 95 to 85 weight percent of the high boiling point solvent and 5 to 15 weight percent of the low boiling point solvent.

In an embodiment, the present low-refractivity optical clear resin can be cured at the temperature ranging between 50° C. to 170° C. and preferably ranging between 60° C. to 160° C. to form a low-refractivity optical clear layer, wherein the yellow index of the low-refractivity optical clear layer is not more than 1.5 and preferably not more than 1.0; and the refractive index thereof is ranging between 1.1 and 1.35 and preferably ranging between 1.2 and 1.3.

In an embodiment, the present low-refractivity optical clear resin can be cured to form a low-refractivity optical clear layer with a surface roughness Sa in the range between 5 μm and 50 μm.

The viscosity of the present low-refractivity optical clear resin is ranging between 2 mPa·s and 20 mPa·s, and the surface tension thereof is ranging between 20 dyne/cm and 40 dyne/cm.

In the organic solvent composition of the present low-refractivity optical clear resin, the surface tension of the high boiling point solvent is ranging between 30 dyne/cm and 38 dyne/cm, and the surface tension of the low boiling point solvent is ranging between 23 dyne/cm and 30 dyne/cm.

In an embodiment of the present low-refractivity optical clear resin, the high boiling point solvent of the organic solvent composition partially comprises a middle boiling point solvent with a boiling point ranging between 150° C. and 180° C. and a surface tension ranging between 20 dyne/cm and 30 dyne/cm, wherein the high boiling point solvent comprises 25 weight percent to 45 weight percent of the middle boiling point solvent.

In the present low-refractivity optical clear resin, the amount of the hydroxyalkylsilane monomer in the polysiloxane composition is 10 to 70 parts by weight per 10 parts by weight of the polysiloxane.

In the present low-refractivity optical clear resin, the polysiloxane in the polysiloxane composition is synthesized by the hydrolysis and condensation or co-condensation of silane monomers with a weight average molecular weight (Mw) ranging between 5,000 and 100,000 g/mol.

In the present low-refractivity optical clear resin, the hydroxyalkylsilane monomer in the polysiloxane composition is represented by the following formula (I):

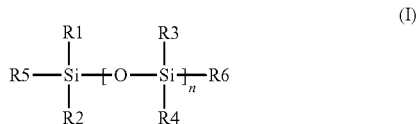

wherein R1, R2, R3, R4 and R5 are respectively C1-C10 alkyl groups or C5-C20 aryl groups, optionally mono-substituted, double-substituted or triple-substituted with C1-C10 alkyl groups or C3-C10 alicyclic groups; R6 is a C6-C30 alkyl chain, optionally having 1 to 3 double or triple bonds, and comprising at least one hydroxyl group; and n is an integer from 0 to 10; and the boiling point of the hydroxyalkylsilane monomer is ranging between 80° C. and 180° C.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

One aspect of the present invention is to provide a low-refractivity optical clear resin comprising a polysiloxane composition and an organic solvent composition. The low-refractivity optical clear layer prepared from present low-refractivity optical clear resin shows a refractive index of ranging between 1.1 and 1.35 for enhancing the light extracting efficiency, and can reach an desired thickness for the coating of the micro-LED display devices without crack and show a limited yellowing without affecting the hue and chroma of the display.

The present low-refractivity optical clear resin comprises a polysiloxane composition and an organic solvent composition, wherein the polysiloxane composition comprises a polysiloxane and a hydroxyalkylsilane monomer, and the organic solvent composition comprises a high boiling point solvent with a boiling point more than 180° C. and a low boiling point solvent with a boiling point less than 150° C.; wherein the used amount of the organic solvent composition is 50 to 120 parts by weight per 10 parts by weight of the polysiloxane composition.

In an embodiment, as the present low-refractivity optical clear resin is heated to the temperature ranging between 50° C. to 170° C., the polysiloxane in the polysiloxane composition starts to be cured and the solvent composition dominates the evaporation regime due to the gradient of the boiling points of the solvent composition to make the evaporation of the hydroxyalkysiloxane uniformly to produce a low-refractivity optical clear layer with porous structure. Thus, the low-refractivity optical clear layer prepared from present low-refractivity optical clear resin can reach an adequate thickness without crack but with a satisfied low refractivity index and yellow index. In an embodiment of the present low-refractivity optical clear resin, the organic solvent composition comprises 97 to 80 weight percent of the high boiling point solvent and 3 to 20 weight percent of the low boiling point solvent. In a preferred embodiment of the present low-refractivity optical clear resin, the organic solvent composition comprises 95 to 85 weight percent of the high boiling point solvent and 5 to 15 weight percent of the low boiling point solvent.

The present low-refractivity optical clear resin can be applied to a substrate by any methods commonly used in the related art, for example, bar coating, doctor blade coating, dip coating, roll coating, spinning coating, ink jet coating and the like and cured at the temperature ranging between 50° C. to 170° C. and preferably ranging between 60° C. to 160° C. to form a low-refractivity optical clear layer. The yellow index of the low-refractivity optical clear layer is not more than 1.5 and preferably not more than 1.0; and the refractive index thereof is ranging between 1.1 and 1.35 and preferably ranging between 1.2 and 1.3. In an embodiment of the present invention, the thickness of the low-refractivity optical clear layer can be 1 μm or more. In an embodiment of the present invention, for evaporating the hydroxyalkylsilane in the polysiloxane composition better, the coating step of the low-refractivity optical clear resin can be repeatedly applied to obtain a desired thickness of the low-refractivity optical clear layer. During the thermal curing step of the present low-refractivity optical clear resin, the polysiloxane chain of the present low-refractivity optical clear resin will align in corresponding to the diffusing and evaporating conditions for certain solvent composition.

Therefore, although the low refractivity layer was formed by multi-coating, the refractive index and yellow index thereof will not be affected by the interfaces of the layers.

The surface roughness Sa of the low-refractivity optical clear layer prepared from the cured low-refractivity optical clear resin of the present invention is ranging between 5 μm and 50 μm. As the surface roughness Sa is too low, the surface tension of the low-refractivity optical clear layer is insufficient for the following encapsulation or the lamination of other functional layers. As the surface roughness Sa is too high, the haze of the low-refractivity optical clear layer will be increased.

The present low-refractivity optical clear resin when being applied on the surfaces of micro-LED display devices is preferably applied by ink-jet coating in order to fill the step difference of the micro-LED display devices. In this embodiment of the present invention, the viscosity of the present low-refractivity optical clear resin is preferably ranging between 2 mPa·s and 20 mPa·s at 25° C. As the viscosity of the present low-refractivity optical clear resin is less than 2 mPa·s at 25° C., the ink-jet coating droplets generated in the ink-jet coating process may be unstable and inconstant. As the viscosity of the present low-refractivity optical clear resin is more than 20 mPa·s at 25° C., the spreading of the ink-jet coating droplets during the ink-jet coating process may be adverse.

Furthermore, the low-refractivity optical clear resin of the present invention can be used to prepare a low-refractivity optical clear layer with a desired thickness without crack on the micro-LED display device. The surface tension of the present low-refractivity optical clear resin is ranging between 20 dyne/cm and 40 dyne/cm. As the surface tension of the present low-refractivity optical clear resin is less than 20 dyne/cm, it is adverse to generate continuous and constant ink-jet coating droplets at the nozzle of the ink-jet coating device. As the surface tension of the present low-refractivity optical clear resin is more than 40 dyne/cm, the spreading of the ink-jet coating droplets may be reduced to result in the optical clear resin crystallized after being cured, the crystallization may affect the transparency and adhesion of the formed low-refractivity optical clear layer.

In a preferred embodiment of the low-refractivity optical clear resin of the present invention, the light transmission of the low-refractivity optical clear layer prepared from the cured low-refractivity optical clear resin is not less than 91%, and the yellow index thereof is not more than 1.5 and preferably not more than 1. Therefore the hue and chroma of the display device will be unaffected when the present low-refractivity optical clear layer is applied.

In the low-refractivity optical clear resin of a preferred embodiment of the present invention, the surface tension of the high boiling point solvent is ranging between 30 dyne/cm and 38 dyne/cm, and the surface tension of the low boiling point solvent is ranging between 23 dyne/cm and 30 dyne/cm In the low-refractivity optical clear resin of the present invention, the high boiling point solvent of the organic solvent composition can be, for example, an ester, such as dimethyl succinate, dimethyl glutarate, γ-butyrolactone or ethylene glycol butyl ether acetate; an ether, such as, ethylene glycol monobutyl ether, triethylene glycol butyl ether, diethylene glycol monoethyl ether or tetraethylene glycol dimethyl ether; or a pyrrole, such as, 1-phenylpyrroline, 2-pyrrolidone or N-methylpyrrolidone or combinations thereof, but not limited thereto. In a preferred embodiment of the low refractive index optical resin of the present invention, the high boiling point solvent can be γ-butyrolactone, diethylene glycol monoethyl ether or N-methylpyrrolidone or combinations thereof.

In the low-refractivity optical clear resin of the present invention, the low boiling point solvent can be, for example, an alcohol, such as pentanol, isopentanol, 2-ethyl-butanol, 2-methyl-2-butanol or, 2,2-dimethyl-propanol; an alcohol ether, such as, ethylene glycol monomethyl ether, ethylene glycol monoethyl ether, ethylene glycol dimethyl ether, propylene glycol monomethyl ether or propylene glycol methyl ether acetate, or combinations thereof, but not limited thereto. In a preferred embodiment of the low-refractivity optical clear resin of the present invention, the low boiling point solvent is 2-ethylbutanol, 2-methyl-2-butanol, ethylene glycol monoethyl ether, ethylene glycol dimethyl ether, propylene glycol monomethyl ether or combinations thereof.

In the low-refractivity optical clear resin of the present invention, a portion of the high boiling point solvent in the organic solvent composition can be substituted by a middle boiling point solvent with a boiling point ranging between 150° C. and 180° C. and a surface tension ranging between 20 dyne/cm and 30 dyne/cm, wherein 25 weight percent to 35 weight percent of the high boiling point solvent can be substituted by the middle boiling point solvent.

In the low-refractivity optical clear resin of the present invention, a suitable middle boiling point solvent can be, for example, an alcohol, such as, 3-methoxybutanol, 4-methyl-1-pentanol or diacetone alcohol; or an alcohol ether, such as, propylene glycol n-propyl ether, ethylene glycol mono-tert-butyl ether, or ethylene glycol monobutyl ether or combinations thereof, but not limited thereto. In a preferred embodiment of the low-refractivity optical clear resin of the present invention, the middle boiling point solvent can be 3-methoxybutanol, 4-methyl-1-pentanol or combinations thereof.

In the low-refractivity optical clear resin of the present invention, the polysiloxane is synthesized by the hydrolysis and condensation or co-condensation of silane monomers, and the suitable silane monomer is selected from, such as, but not limited to, at least one of a group consisting of ytetramethoxysilane, tetraethoxysilane, dimethyldimethoxysilane, dimethyldiethoxysilane, methyltrimethoxysilane, methyltriethoxysilane, trimethylmethoxysilane glycidyltrimethoxysilane, vinyltrimethoxysilane, glycidoxypropyltrimethoxysilane, phenyltrimethoxysilane or combinations thereof. The weight average molecular weight (Mw) of the polysiloxane is ranging between 5,000 and 100,000 g/mol, and preferably ranging between 20,000 g/mol and 50,000 g/mol.

In the low-refractivity optical clear resin of the present invention, the hydroxyalkylsilane monomer in the polysiloxane composition is represented by the following formula (I):

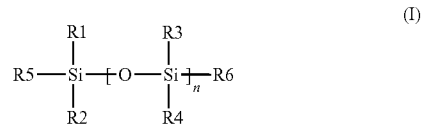

wherein R1, R2, R3, R4 and R5 are respectively C1-C10 alkyl groups or C5-C20 aryl groups, optionally mono-substituted, double-substituted or triple-substituted with C1-C10 alkyl groups or C3-C10 alicyclic groups; R6 is a C6-C30 alkyl chain, optionally having 1 to 3 double or triple bonds, and comprising at least one hydroxyl group; and n is an integer from 0 to 10. In a preferred embodiment of the low-refractivity optical clear resin of the present invention, R6 in formula (I) is a C10-C20 alkyl chain, and the boiling point of the hydroxyalkylsilane monomer is preferably ranging between 80° C. and 180° C.

In the low-refractivity optical clear resin of the present invention, polysiloxane composition can further comprises a short chain polysiloxane, for example, bishydroxyalkyl-oligo(alkylsiloxane) having 1 to 20 silicon atoms, to enhance the mechanical properties of the low-refractivity optical clear resin after being cured.

The polysiloxane composition in the present low-refractivity optical clear resin can preferably be commercially available products, such as "IOC-572-JO1", "IOC-573-J2", "IOC-573-J6" or "IOC-573-J4" manufactured by NAGASE & CO., LTD., Japan.

In other embodiments of the present invention, other additives, such as catalyst, antistatic agents, ultraviolet absorbers, antioxidants, surface modifiers, leveling agents or deforming agents, can be added as required.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

EXAMPLE

Example 1

10 g of polysiloxane composition (IOC-573-J2, commercially obtained from NAGASE & CO., LTD., Japan), 5 g of propylene glycol monomethyl ether (PGME), 85 g of N-methylpyrrolidone (NMP) were mixed evenly to prepare a low-refractivity optical clear resin with a surface tension of 37 dyne/cm and a viscosity of 7.6 mPa·s at 25° C.

The prepared low-refractivity optical clear resin was coated on a glass substrate by ink jet coating method and cured at 150° C. A low-refractivity optical clear layer with a thickness of 1.75 μm and a refractive index of 1.25 was obtained without crack. The optical properties of the obtained low-refractivity optical clear layer were determined in accordance with the measurements described hereinafter, and the test results were shown in Table 1.

Furthermore, the above-mentioned coating and curing procedures were further repeatedly applied twice on the obtained low-refractivity optical clear layer to obtain a thicker low-refractivity optical clear layer with a thickness of 3.82 μm and a refractive index of 1.22 without crack. The optical properties of the obtained low-refractivity optical clear layer were determined in accordance with the measurements described hereinafter, and the test results were shown in Table 1.

Example 2

15 g of polysiloxane composition (IOC-573-J4, commercially obtained from NAGASE & CO., LTD., Japan), 7 g of PGME, 80 g of diethylene glycol diethyl ether (DEMEE) were mixed evenly to prepare a low-refractivity optical clear resin with a surface tension of 24 dyne/cm and a viscosity of 12.5 mPa·s at 25° C.

The prepared low-refractivity optical clear resin was coated on a glass substrate by ink jet coating method and cured at 80° C. to obtain a low-refractivity optical clear layer with a thickness of 3.18 μm and a refractive index of 1.26 without crack. The optical properties of the obtained low-refractivity optical clear layer were determined in accordance with the measurements described hereinafter, and the test results were shown in Table 1.

Furthermore, the above-mentioned coating and curing procedures were further repeatedly applied once on the obtained low-refractivity optical clear layer to obtain a thicker low-refractivity optical clear layer with a thickness of 3.28 μm and a refractive index of 1.26 without crack. The optical properties of the obtained low-refractivity optical clear layer were determined in accordance with the measurements described hereinafter, and the test results were shown in Table 1.

Example 3

The obtained low-refractivity optical clear resin from Example 2 was coated on a glass substrate by ink jet coating method and cured at 150° C. A low-refractivity optical clear resin layer with a thickness of 2.82 μm and a refractive index of 1.24 was obtained without crack. The optical properties of the obtained low-refractivity optical clear layer were determined in accordance with the measurements described hereinafter, and the test results were shown in Table 1.

Furthermore, the above-mentioned coating and curing procedures were further repeatedly applied five times on the obtained low-refractivity optical clear layer to obtain a thicker low-refractivity optical clear layer with a thickness of 8.02 μm and a refractive index of 1.23 without crack. The optical properties of the obtained low-refractivity optical clear layer were determined in accordance with the measurements described hereinafter, and the test results were shown in Table 1.

Example 4

10 g of polysiloxane composition (IOC-573-J6, commercially obtained from NAGASE & CO., LTD., Japan), 7 g of PGME, 54 g of DEMEE and 29 g of propylene glycol n-propyl ether (PnP) were mixed evenly to prepare a low-refractivity optical clear resin with a surface tension of 24 dyne/cm and a viscosity of 8.1 mPa·s at 25° C.

The prepared low-refractivity optical clear resin was coated on a glass substrate by ink jet coating method and cured at 80° C. A low-refractivity optical clear layer with a thickness of 3.26 μm and a refractive index of 1.26 was obtained without crack. The optical properties of the obtained low-refractivity optical clear layer were determined in accordance with the measurements described hereinafter, and the test results were shown in Table 1.

Furthermore, the above-mentioned coating and curing procedures were further repeatedly applied five times on the obtained low-refractivity optical clear layer to obtain a thicker low-refractivity optical clear layer with a thickness of 7.47 μm and a refractive index of 1.26 without crack. The optical properties of the obtained low-refractivity optical clear layer were determined in accordance with the measurements described hereinafter, and the test results were shown in Table 1.

Comparative Example 1

10 g of polysiloxane composition (IOC-572-J1, commercially obtained from NAGASE & CO., LTD., Japan), 30 g of PGME and 60 g of ethylene glycol (EG) were mixed evenly to prepare a low-refractivity optical clear resin.

The prepared low-refractivity optical clear resin was coated on a glass substrate by ink jet coating method and cured at 100° C. A low-refractivity optical clear resin layer with a thickness of 2.8 μm and a refractive index of 1.25 was obtained. The optical properties of the obtained low-refractivity optical clear layer were determined in accordance with the measurements described hereinafter, and the test results were shown in Table 1.

Optical Properties Measurement

Light transmittance measurement: The light transmittance was measured according to the test method of JIS K7361 by NDH-2000 Haze Meter (manufactured by Nippon Denshoku Industries, Japan).

Haze measurement: The haze was measured according to the test method of JIS K7136 by NDH-2000 Haze Meter.

Refractive index measurement: The refractive index was measured according to the test method of JIS K0062:1992 "Test methods for refractive index of chemical products" by CM-26d Spectrophotometer (manufactured by Konica Minolta Inc., Japan).

$L^*$, $a^*$, $b^*$ and yellow index (YI) measurement: The $L^*$, $a^*$ and $b^*$ were measured according to the definition of CIE-Lab, and the yellow index was measured according to the test method of ASTM E313 by CDM-08 Color-difference Meter (manufactured by Kun-Ling Tech. Corp., Taiwan).

TABLE 1

The optical properties of the low-refractivity optical clear layer obtained from Examples 1 to 4 and Competitive Example 1

| Properties | Example 1 | | Example 2 | | Example 3 | | Example 4 | | Comparative Example 1 |
| --- | --- | --- | --- | --- | --- | --- | --- | --- | --- |
| Times of repeating of coating & curing | 1 | 3 | 1 | 2 | 1 | 6 | 1 | 6 | 1 |
| Tihickness (μm) | 1.75 | 3.82 | 3.18 | 3.28 | 2.82 | 8.02 | 3.26 | 7.47 | 2.8 |
| Transmittance (%) | 93.1 | 93.0 | 93.1 | 93.1 | 92.4 | 92.8 | 92.9 | 93.0 | 90.8 |
| Haze (%) | 0.11 | 0.70 | 0.20 | 0.24 | 2.15 | 4.42 | 0.39 | 0.40 | 5.64 |
| Refractive index | 1.25 | 1.22 | 1.26 | 1.26 | 1.24 | 1.23 | 1.26 | 1.26 | 1.25 |
| $L^*$ | 97.6 | 97.7 | 97.5 | 97.5 | 97.6 | 97.3 | 97.6 | 97.3 | 95.7 |
| $a^*$ | −0.1 | −0.2 | −0.2 | −0.2 | −0.2 | −0.2 | −0.2 | −0.2 | 0.0 |
| $b^*$ | 0.3 | 0.4 | 0.3 | 0.3 | 0.3 | 0.5 | 0.2 | 0.4 | 1.0 |
| Yellow index (YI) | 0.4 | 0.6 | 0.5 | 0.5 | 0.5 | 0.8 | 0.4 | 0.7 | 2.2 |

Each of the low-refractivity optical clear layers formed on the glass substrates in Examples 1 to 4 has a thickness ranging from 1.75 to 8.02 μm, a yellow index ranging from 0.4 to 0.8, and a refractive index ranging 1.22 and 1.26. The desired thickness of the low refractivity layers can be obtained by repeatedly applying coating and curing procedures, and the optical properties such as refractive index or yellowness index were limitedly affected by the multilayers. As shown in the Competitive Example, the low-refractivity optical clear layer of the Competitive Example 1 was prepared with a solvent composition having an exceed amount of low boiling point solvent, propylene glycol mono-methyl ether (PGME), having a refractive index of 1.25 and a yellow index as high as 2.2, which is unsuitable for micro-LED display devices. Therefore, the low-refractivity optical clear resins obtained from Examples 1 to 4 can be used in micro-LED display devices to enhance the light extracting efficiency thereof, without affecting of the hue and chroma of the display devices. and can reach an adequate thickness without crack.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. An optical clear resin composition having a refractive index between 1.1 and 1.35, comprising:
   a polysiloxane composition, comprising a polysiloxane and a hydroxyalkylsilane monomer; and
   an organic solvent composition, comprising a high boiling point solvent with a boiling point more than 180° C. and a low boiling point solvent with a boiling point less than 150° C.;
   wherein the used amount of the organic solvent composition is 50 to 120 parts by weight per 10 parts by weight of the polysiloxane composition, and the organic solvent composition comprises 97 to 80 weight percent of the high boiling point solvent and 3 to 20 weight percent of the low boiling point solvent.

2. The optical clear resin composition having a refractive index between 1.1 and 1.35 as claimed in claim 1, wherein the organic solvent composition comprises 95 to 85 weight percent of the high boiling point solvent and 5 to 15 weight percent of the low boiling point solvent.

3. The optical clear resin composition having a refractive index between 1.1 and 1.35 as claimed in claim 1, wherein the viscosity of the low-refractivity optical clear resin is ranging between 2 mPa·s and 20 mPa·s at 25° C., and the surface tension thereof is ranging between 20 dyne/cm and 40 dyne/cm.

4. The optical clear resin composition having a refractive index between 1.1 and 1.35 as claimed in claim 1, wherein the surface tension of the high boiling point solvent is ranging between 30 dyne/cm and 38 dyne/cm, and the surface tension of the low boiling point solvent is ranging between 23 dyne/cm and 30 dyne/cm.

5. The optical clear resin composition having a refractive index between 1.1 and 1.35 as claimed in claim 1, wherein the high boiling point solvent is γ-butyrolactone, diethylene glycol monoethyl ether, N-methylpyrrolidone or combinations thereof.

6. The optical clear resin composition having a refractive index between 1.1 and 1.35 as claimed in claim 1, wherein the low boiling point solvent is 2-ethylbutanol, 2-methyl-2-butanol, ethylene glycol monoethyl ether, ethylene glycol dimethyl ether, propylene glycol monomethyl ether, or combinations thereof.

7. The optical clear resin composition having a refractive index between 1.1 and 1.35 as claimed in claim 1, further comprising a middle boiling point solvent with a boiling point ranging between 150° C. and 180° C. and a surface tension ranging between 20 dyne/cm and 30 dyne/cm.

8. The optical clear resin composition having a refractive index between 1.1 and 1.35 as claimed in claim 7, wherein the middle boiling point solvent is present at an amount of 25 weight percent to 35 weight percent based on the total amount of the middle boiling point solvent and the high boiling point solvent.

9. The optical clear resin composition having a refractive index between 1.1 and 1.35 as claimed in claim 1, wherein the content of the hydroxyalkylsilane monomer is 10 to 70 parts by weight per 10 parts by weight of the polysiloxane, and the boiling point of the hydroxyalkylsilane monomer is ranging between 80° C. and 180° C.

10. The optical clear resin composition having a refractive index between 1.1 and 1.35 as claimed in claim 1, wherein the polysiloxane is synthesized by the hydrolysis and condensation or co-condensation of silane monomers selected from the group consisting of tetramethoxysilane, methyltrimethoxysilane, methyltriethoxysilane, dimethyldimethoxysilane, dimethyldiethoxysilane, trimethylmethoxysilane, vinyltrimethoxysilane, glycidoxypropyltrimethoxysilane, phenyltrimethoxysilane, methacryloyloxypropyltrimethoxysilane and combination thereof, and the weight average molecular weight (Mw) of the polysiloxane is ranging between 5,000 and 100,000 g/mol.

11. The optical clear resin composition having a refractive index between 1.1 and 1.35 as claimed in claim 1, wherein the hydroxyalkylsilane monomer is represented by the following formula (I):

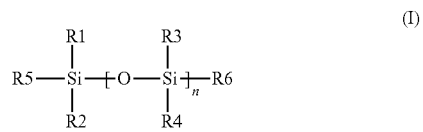

wherein R1, R2, R3, R4 and R5 are respectively C1-C10 alkyl groups or C5-C20 aryl groups optionally mono-substituted, double-substituted or triple-substituted with C1-C10 alkyl groups or C3-C10 alicyclic groups; R6 is a C6-C30 alkyl chain, optionally having 1 to 3 double or triple bonds, and comprising at least one hydroxyl group; and n is an integer from 0 to 10.

* * * * *